United States Patent [19]
Yoshiro et al.

[11] Patent Number: 5,156,003
[45] Date of Patent: Oct. 20, 1992

[54] MAGNETIC REFRIGERATOR

[75] Inventors: Saji Yoshiro; Hiroaki Toda; Tetsuo Takagi; Takao Sugioka; Masaru Inoue; Kohei Otani; Manabu Sato, all of Osaka, Japan

[73] Assignee: Koatsu Gas Kogyo Co., Ltd., Osaka, Japan

[21] Appl. No.: 788,100

[22] Filed: Nov. 5, 1991

[30] Foreign Application Priority Data

Nov. 8, 1990 [JP] Japan .................................. 2-305586
Feb. 28, 1991 [JP] Japan .................................. 3-59637

[51] Int. Cl.$^5$ ............................................. F25B 21/02
[52] U.S. Cl. ........................................ 62/3.1; 505/891
[58] Field of Search ........................... 62/3.1; 505/891

[56] References Cited

U.S. PATENT DOCUMENTS

| | | | |
|---|---|---|---|
| 4,107,935 | 8/1978 | Steyert | 62/3.1 |
| 4,332,135 | 6/1982 | Barclay | 62/3.1 |
| 4,464,903 | 8/1984 | Nakagome | 62/3.1 |
| 4,509,334 | 4/1985 | Nakagome | 62/3.1 X |
| 4,532,770 | 8/1985 | Hakuraku | 62/3.1 |

Primary Examiner—Alan Cohan
Attorney, Agent, or Firm—Koda and Androlia

[57] ABSTRACT

A magnetic refrigerator comprising a magnet generating a high-intensity magnetic field, a tube-shaped superconducting magnetic shield, a magnetic working material and a reciprocating means for reciprocatively moving the superconducting magnetic shield or the magnetic working material, the magnetic refrigerator being arranged such that a magnetization process wherein the magnetic working material is magnetized in the high-intensity magnetic field and a demagnetization process wherein the magnetic working material is demagnetized by being accommodated in the hollow section of the magnetic shield are repeated by the reciprocating means so that the magnetic working material generates coldness.

By using the property of a tube-shaped superconductor which can shield the magnetism of an external magnetic field passing through the hollow section of the tube and can generate a zero-intensity magnetic field in the hollow section, the magnetic working material magnetized in the high-intensity magnetic field generated by the magnet is inserted into the hollow section of the tube-shaped superconducting shield and is demagnetized in an adiabatic condition to generate coldness. This coldness is used to cool the target cold bath.

17 Claims, 11 Drawing Sheets

FIG. 1(a)
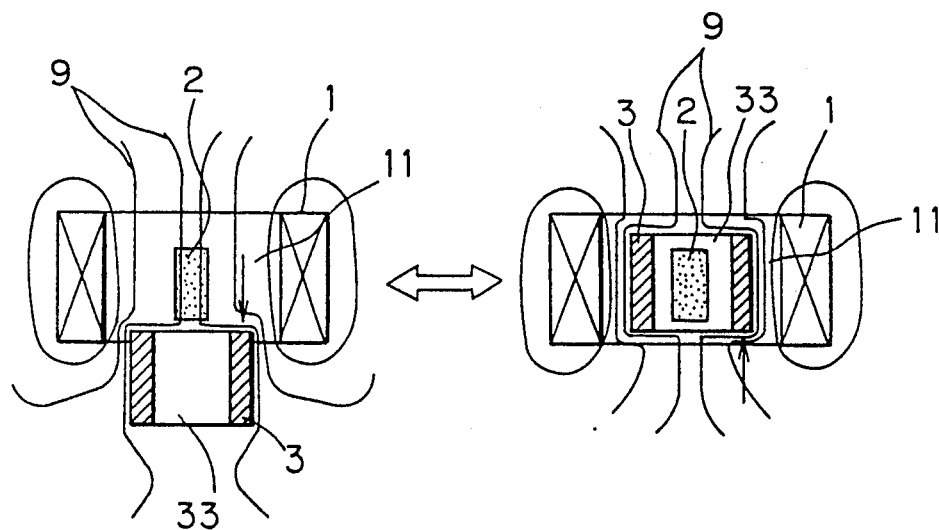
FIG. 1(b)
FIG. 1(c)
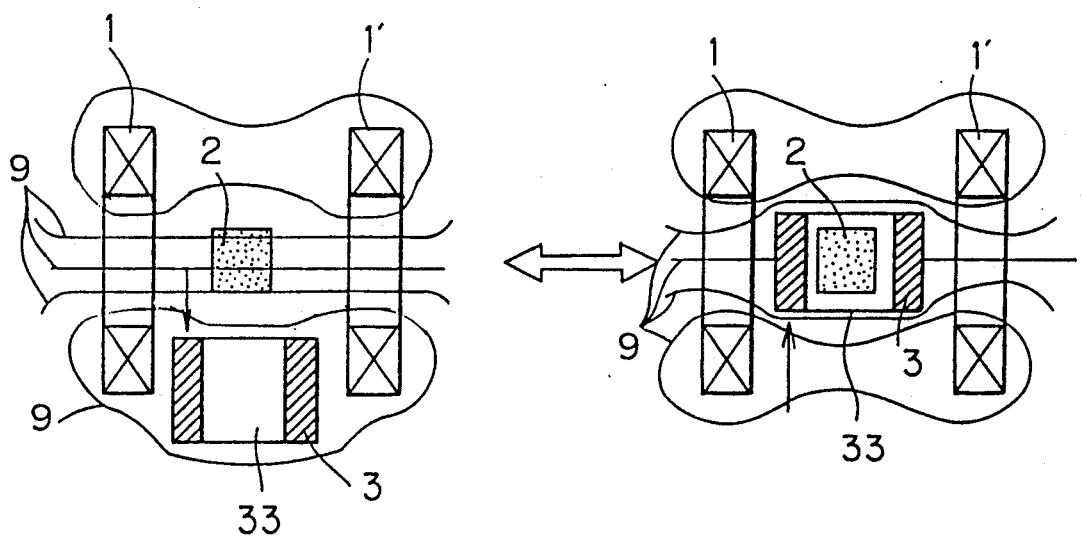
FIG. 1(d)

MAGNETIC REFRIGERATOR

BACKGROUND OF THE INVENTION

1. Field of the Invention

The present invention relates to a magnetic refrigerator which has a magnetic shield between a magnet for generating a high-intensity magnetic field and a magnetic working material, and activates the magnetic working material demagnetized in an a almost-zero-intensity magnetic field to generate coldness.

2. Prior Art

Although a magnetic refrigerator which uses an adiabatic demagnetization method,, i.e., a conventional method for refrigeration to ultra-low temperature ranges has been used widely for research purposes, it has not been used in practice for industrial purposes. Such a magnetic refrigerator basically comprises a magnet generating a large magnetic field, a magnetic working material generating coldness in an adiabatic demagnetization process, a mechanism for repeatedly magnetizing and demagnetizing the magnetic working material and an adiabatic container for accommodating the magnetic working material.

Regarding the magnet of such a magnetic refrigerator, a superconducting magnet comprising a superconducting filament coil has been able to be used instead of a conventional electromagnet with an iron core. Compared with a magnetic flux density of about 2T generated by an electromagnet, a high-intensity magnetic field of 5T or more can be generated in the hollow section of a superconducting coil.

The magnetic working material is magnetized adiabatically in a high-intensity magnetic field and generates heat. In a zero-intensity magnetic field, the material is demagnetized adiabatically and generates coldness. Gadolinium-gallium-garnet or chrome alum is used as a material whose temperature changes greatly depending on the change in the magnetic flux density near the temperature of liquid helium. In addition, a variety of materials which are usable near the temperature of liquid helium are being examined.

Regarding the methods for transferring coldness which is generated by cooling the heat generated by the magnetic working material, various conventional methods, such as a method of using the circulation of gases or liquids, a method of using the heat conduction of solids and a method of using heat pipes, have been examined.

Regarding the means for repeatedly magnetizing and demagnetizing the magnetic working material, two conventional methods are available: a method for controlling the generated magnetic field itself by repeatedly turning on and off the current to an electromagnet or a superconducting coil and a method for repeatedly moving the magnetic working material from a high-intensity magnetic field range to a low-intensity magnetic field range in a constant magnetic field. The coil current on/off method is used to achieve a static magnetic refrigerator in which the magnetic working material is fixed. With this method, however, it is difficult to turn on and off large current. In the case of using a superconducting coil, large current also flows in the electric wires connected from the coil to an external power supply and in the external power supply itself when current is turned on and off. This generates Joule heat loss and reduces the heat efficiency of the refrigerator. This method is thus mainly used for small refrigerators.

In the case of practically available magnetic refrigerators, a method of using a superconducting coil in the permanent current mode to maintain a high-intensity magnetic field at all times so that the magnetic working material itself is reciprocated or rotated in the hollow section of the coil or from the proximately of the opening of the coil to the distal section of the coil has been widely examined.

However, in the case of the above-mentioned method of reciprocating the magnetic working material, if the magnetic working material is moved to a completely-zero-intensity magnetic field, it is necessary to move the magnetic working material far away from the superconducting coil to a position wherein the intensity of the magnetic field is negligibly low. As a result, the reciprocating or rotating movement stroke of the magnetic working material must be increased. The size of such a refrigerator is required to be large while its refrigerating performance is rather low. In a conventional technology, the movement stroke is set at a practically satisfactory value. In this case, the demagnetizing process ends in the low-intensity magnetic field generated by the coil and the magnetic flux density of the magnetic working material is not zero. As can be clearly understood according to the magnetic Carnot cycle diagram, the refrigerating heat efficiency of the conventional refrigerator is lower than that of an ideal refrigerator which demagnetizes in a zero-intensity magnetic field.

As a conventional technology wherein the movement stroke of the magnetic working material is shortened and demagnetization is performed in a zero-intensity magnetic field, there is a known method, wherein a sub-coil disposed coaxially at the proximity of the main superconducting coil generating a high-intensity magnetic field for magnetization generates an opposite magnetic field which cancels the magnetic field generated by the main coil so that a zero-intensity magnetic field region is formed by the cancellation at a position very close to the opening of main coil.

In the case of the above-mentioned static magnetic refrigerator in which the magnetic working material is fixed, a type which uses the superconducting coil in the permanent current mode to magnetized and demagnetize the magnetic working material is the most favorable refrigerator since it requires no complicated movement means for the magnetic working material and no superconducting coil current on/off means and the energy efficiency of the refrigerator is superior. As a prior art which achieves this type of refrigerator, a refrigerator which magnetically shields and demagnetizes the magnetic working material by fixing the magnetic working material outside the opening of the superconducting coil and by using a magnetic shield provided reciprocatively between the superconducting coil and the magnetic working material has been disclosed in the Japanese Patent Publication No. 63-31716. The flat plane of the magnetic shield described in the publication has the shape of a small plate being smaller than the opening surface of the coil. Since the plate-shaped magnetic shield is smaller than the sectional area of the high-intensity magnetic field, no magnetic shield space is formed behind the magnetic shield. It is therefore almost impossible to demagnetize the magnetic working material. This case is explained as follows. If the plate has high-intensity magnetism, the magnetic lines of force simply permeate the plate, and if the plate is a superconducting plate, the magnetic lines of force pass around the plate to its rear side. In other words, a magnetic shield space can be formed behind a plate-shaped magnetic shield only when the surface area of the plate is sufficiently larger than the sectional area of the magnetic field generation source located ahead of the plate.

In addition, the static magnetic refrigerator requires a heat switch means which achieves efficient heat transfer between the fixed magnetic working material and heat and colds baths. A known conventional heat switch means is a type in which a crystal column is installed reciprocatively at the leading end of a copper heat conductor connected to a small gas cooler which functions as a heat bath, and the end surface of the crystal column faces an end surface of the magnetic working material so that they can closely contact each other. A low-temperature heat switch to be connected to the cold bath is available. The switch comprises a pipe covering the magnetic working material and connected to the cold bath so that a space is provided between the surface of the magnetic working material and the internal surface of the covered pipe to the extent that working gas does not cause convection in the space, and the liquid drops of the working gas generated by cooling the magnetic working material are accommodated in the cold bath.

The above-mentioned heat switch which functions by the close contact and separation of the crystal column and the magnetic working material requires an additional crystal column reciprocating means. Furthermore, the above-mentioned heat pump type comprising the pipe for covering the magnetic working material requires gas as a refrigerant and thus has disadvantages, i.e., slow action and low efficiency.

SUMMARY OF THE INVENTION

Accordingly, the object of the present invention is to provide a compact magnetic refrigerator with a relatively high refrigerating performance, which uses a magnetic shield for demagnetizing the magnetic working material to make the movement stroke (required for the magnetization and demagnetization of the magnetic working material) of the magnetic working material or the magnetic shield shorter than that of a prior art. Another object (related to the above-mentioned object) of the present invention is to provide a magnetic refrigerator with higher refrigerating heat efficiency.

These objects can be achieved by using a tube-shaped magnetic shield made of a superconducting material, by utilizing the hollow section of the tube as a demagnetization space, by accommodating the magnetic working material in the hollow section and by obtaining a demagnetization space with a completely-zero-intensity magnetic field even in the high-intensity magnetic field inside the superconducting coil.

The present invention provides a genus invention which generally determines the relative movement relationship between the magnetic shield and the magnetic working material. The present invention also provides a first invention and a second invention which establish a specific relative relationship between the two means.

More particularly, the first invention provides a static magnetic refrigerator having the tube-shaped magnetic shield reciprocatively disposed between the superconducting coil and the magnetic working material, wherein the drive power required for the reciprocating movement of the magnetic shield is reduced as low as possible and a heat switch means which activates interlocked with the reciprocating movement of the magnetic shield is provided to efficiently transfer the coldness generated by the magnetic working material to the target cold bath, thereby reducing the number of mechanical moving parts, increasing the heat efficiency of the refrigerator and making the size of the magnetic refrigerator compact compared with its refrigerating capacity.

The second invention relates to an unstatic magnetic refrigerator wherein the magnetic working material is reciprocated by a reciprocating means while the magnetic shield is fixed at the proximity of the magnet for generating the magnetic field. The magnetic shield is disposed in a high-intensity magnetic field to shorten the movement range of the magnetic shield.

BRIEF DESCRIPTION OF THE DRAWINGS

FIGS. 1($a$), 1($b$), 1($c$) and 1($d$) show the operating principle of the static magnetic refrigerator of the first invention wherein a magnetic working material is fixed in the high-intensity magnetic field formed by a superconducting coil. FIGS. 1($a$) and 1($b$) show magnetization and demagnetization processes respectively when the hollow section of the superconducting coil is used as a magnetization space. FIGS. 1($c$) and 1($d$) show magnetization and demagnetization processes respectively when the magnetic passing space between a pair of opposed superconducting coils is used as a magnetization space.

FIGS. 2($a$) and 2($c$) show the magnetization conditions of the magnetic working material. FIGS. 2($b$) and 2($d$) show the demagnetization conditions of the magnetic working material.

FIG. 5($a$) shows a vertical sectional view of the superconducting magnetic shield and FIG. 5($b$) shows a transverse sectional view of the superconducting magnetic shield.

FIG. 8($a$) shows the demagnetization condition of the magnetic working material and FIG. 8($b$) shows the magnetization condition of the magnetic working material.

FIG. 11(a) shows the magnetization process of the magnetic working material and FIG. 11(b) shows the demagnetization process of the magnetic working material according to the second invention.

DETAILED DESCRIPTION OF THE INVENTION

Figure 2A:
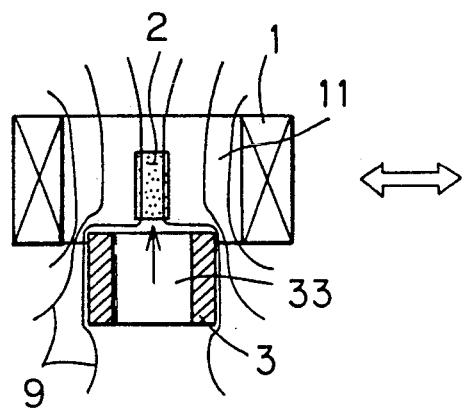
FIGS. 2($a$), 2($b$), 2($c$) and 2($d$) are views similar to FIGS. 1($a$), 1($b$), 1($c$) and 1($d$), showing the operating priciple of the unstatic magnetic refrigerator of the second invention wherein a magnetic working material reciprocates in the high-intensity magnetic field formed by a superconducting coil and in a zero-intensity magnetic field formed by a superconducting magnetic shield.
Figure 2B:
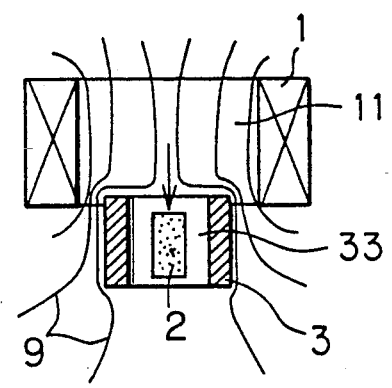
Figure 3:
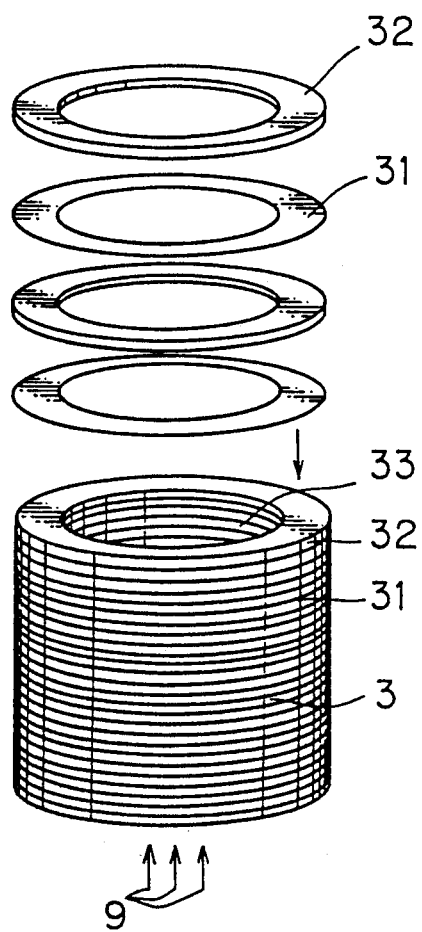
FIG. 3 shows a perspective view of a tube-shaped superconducting magnetic shield comprising a lamination of thin ring-shaped superconductor layers and thin ring-shaped normal conductor layers common with the first and second inventions.
Figure 4:
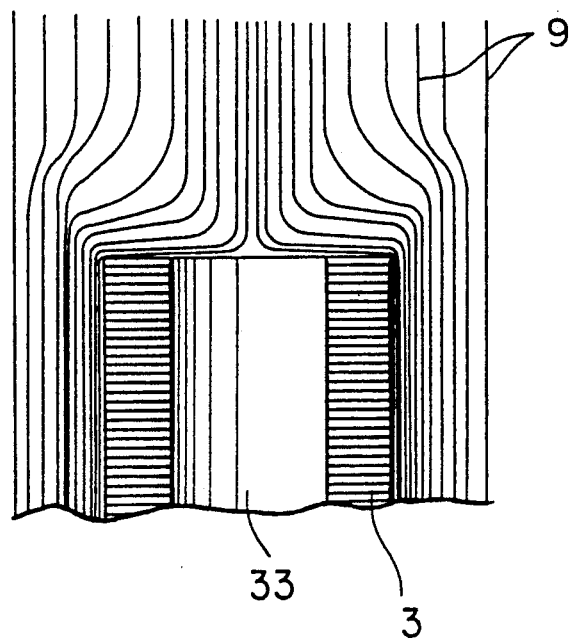
FIG. 4 shows the relationship between the superconducting tube shown in FIG. 3 and the external magnetic field of the tube.

The first and second inventions, and the genus invention which generalizes the two inventions are described below. For easier understanding, these inventions and their corresponding claims and figures are indicated as follows:

The genus invention corresponds to claim 1, the first invention corresponds to claims 2 to 11 and FIGS. 6 to 10, and the second invention corresponds to claims 12 to 17 and FIGS. 2(a) to 2(d), 11 and 12. FIGS. 3 to 5 are common to the first and second inventions.

The genus invention relates to a magnetic refrigerator comprising a magnet generating a high-intensity magnetic field, a tube-shaped superconducting magnetic shield, a magnetic working material and a reciprocating means for reciprocatively moving the superconducting magnetic shield or the magnetic working material, whereby a magnetization process wherein the magnetic working material is magnetized in the high-intensity magnetic field and a demagnetization process wherein the magnetic working material is demagnetized by being accommodated in the hollow section of the magnetic shield are repeated by the reciprocating means so that the magnetic working material generates coldness.

To facilitate the understanding of the genus invention, the first and second inventions are described below before describing the genus invention.

The first invention relates to a static magnetic refrigerator comprising a magnet generating a high-intensity magnetic field, a magnetic working material fixed in the high-intensity magnetic field, a tube-shaped superconducting magnetic shield having a hollow section capable of accommodating the magnetic working material and a reciprocating means for reciprocatively moving the superconducting magnetic shield, whereby a magnetization process wherein the magnetic working material is magnetized in the high-intensity magnetic field by being extracted from the hollow section of the superconducting magnetic shield and a demagnetization process wherein the magnetic working material is demagnetized in the almost-zero-intensity magnetic field in the hollow section of the superconducting magnetic shield by being accommodated in the hollow section of the magnetic shield are repeated by the reciprocating means so that the magnetic working material generates coldness.

The structure of the static magnetic refrigerator of the first invention is explained below referring to FIGS. 1(a), 1(b), 1(c) and 1(d) wich show the operating principle of the static magnetic refrigerator. FIGS. 1(a) and 1(b) show a structure wherein a single superconducting coil 1 is used as a magnet. In FIG. 1(a), the hollow section of the superconducting coil 1 is used as the demagnetization position, and in FIG. 1(b), the hollow section of the superconducting coil 1 is used as the magnetization position. A magnetic working material 2 is fixed in the hollow section of the superconducting coil 1. A tube-shaped superconducting magnetic shield 3 is connected to a reciprocating means (not shown) so that the tube-shaped superconducting magnetic shield 3 can be inserted into the hollow section of the superconducting coil 1. The tube-shaped superconducting magnetic shield 3 is also connected to the reciprocating means so that the hollow section 33 of the superconducting magnetic shield 3 can accommodate the magnetic working material 2. In addition, the superconducting magnetic shield 3 is disposed so that it is movable coaxially to the superconducting coil 1.

Referring to FIG. 1(a), the superconducting magnetic shield 3 is retracted from the hollow section of the superconducting coil 1 and the magnetic working material 2 is magnetized in the high-intensity magnetic field. When the superconducting magnetic shield 3 is inserted into the hollow section of the superconducting coil 1 by the reciprocating means as shown in FIG. 1(b), the magnetic working material 2 is accommodated in the hollow section 33 of the superconducting magnetic shield 3. Since the superconducting tube prevents the magnetic field from entering the hollow section 33 in this condition, an almost-zero-intensity magnetic field is formed and the magnetic working material 2 is demagnetized. The magnetization process shown in FIG. 1(a) and the demagnetization process shown in FIG. 1(b) can be repeated by the reciprocating movement of the superconducting magnetic shield 3 driven by the reciprocating means. The magnetic working material 2 generates heat in the magnetization process and generates coldness in the magnetization process. The generated coldness is used for the refrigerator.

FIGS. 1(c) and 1(d) show a structure wherein the space between a pair of coaxially-disposed superconducting coils 1, 1' is used as the demagnetization position and as the magnetization position respectively. This structure can be achieved by using a pair of magnetic poles of an electromagnet with an iron core, instead of using the pair of coaxially-disposed superconducting coils 1, 1'.

Referring to FIG. 1(c), the superconducting magnetic shield 3 is located in the space between the pair of superconducting coils 1, 1' and is retracted from the magnetic working material 2 fixed on the center axis of the coils. The magnetic working material 2 is thus magnetized in the magnetic field formed by the coils 1, 1'. Referring to FIG. 1(d), the superconducting magnetic shield 3 enters the space between the coils 1, 1' so that the hollow section 33 of the superconducting magnetic shield 3 accommodates the magnetic working material 2. The magnetic working material 2 is thus demagnetized in the almost-zero-intensity magnetic field in the hollow section 33. Therefore, the magnetic working material 2 can be magnetized and demagnetized repeatedly by the repeated movement of the superconducting magnetic shield 3 using the reciprocating means.

The second invention relates to an unstatic magnetic refrigerator comprising a magnet generating a high-intensity magnetic field, a tube-shaped superconducting magnetic shield having a hollow section fixed in the proximity of the magnet, a magnetic working material movable to be accommodated in the hollow section and a reciprocating means for reciprocatively moving the magnetic working material, whereby a magnetization process wherein the magnetic working material is magnetized in the high-intensity magnetic field by being extracted from the hollow section of the superconducting magnetic shield and a demagnetization process wherein the magnetic working material is demagnetized in the almost-zero-intensity magnetic field in the hollow section of the superconducting magnetic shield by being accommodated in the hollow section of the magnetic shield are repeated by the reciprocating means so that the magnetic working material generates coldness.

The structure of the second invention is explained below referring to FIGS. 2(a), 2(b), 2(c) and 2(d) which show the operating principle of the magnetic refrigerator of the second invention. FIGS. 2(a) and 2(b) show a structure wherein a single superconducting coil 1 is used as a magnet. In FIG. 2(a), the hollow section of the superconducting coil 1 is used as the demagnetization position, and in FIG. 2(b), the hollow section of the superconducting coil 1 is used as the magnetization position. A tube-shaped superconducting magnetic shield 3 is disposed and fixed near the opening of the superconducting coil 1, coaxially to the coil 1. A magnetic working material 2 is repeatedly moved by a reciprocating means (not shown) from the high-intensity magnetic field position in the hollow section of the superconducting coil 1 to the position in the hollow section 33 of the superconducting magnetic shield 3. The magnetic working material 2 is magnetized in the high-intensity magnetic field in the hollow section of the superconducting coil 1 and is demagnetized in the hollow section 33 of the superconducting magnetic shield 3.

Figure 2C:
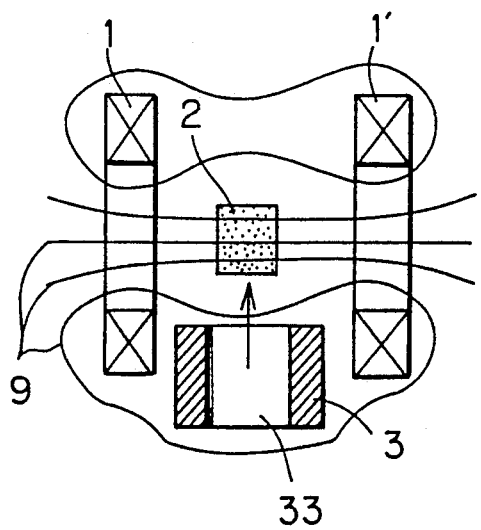
Figure 2D:
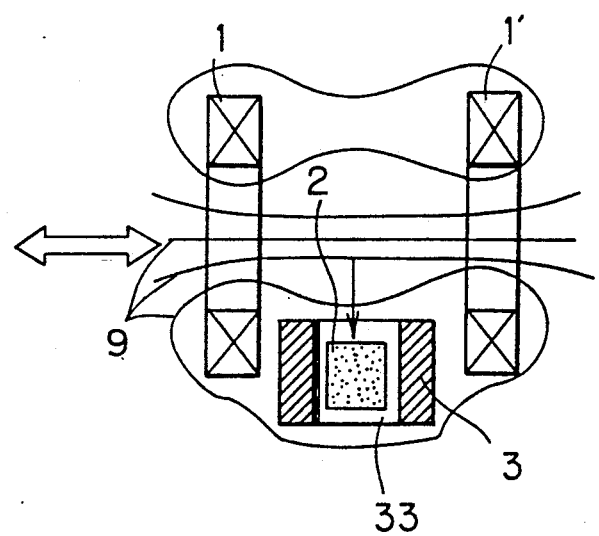

FIGS. 2(c) and 2(d) show a structure wherein the high-intensity magnetic field on the center axis of a pair of superconducting coils 1, 1' in the space between the pair of the superconducting coils 1, 1' is used as the magnetization position, and the hollow section 33 of the superconducting magnetic shield 3 fixed and disposed at an off-center position between the pair of the superconducting coils 1, 1' is used as the demagnetization position respectively. The magnetic working material 2 is repeatedly moved between the two positions by a reciprocating means (not shown).

The technical matters common to the first and second inventions are then explained below.

The simplest superconducting magnetic shield used in the present invention is a single superconducting tube. The magnetic lines of force of an external magnetic field do not permeate such a superconducting tube and its hollow section regardless of whether the magnetic lines of force are parallel or perpendicular to the center axis of the tube, and an almost-zero-intensity magnetic field is formed in the hollow section. This is explained that current forming a magnetic field which cancels the external magnetic field flows in the tube's internal cross-section perpendicular to the magnetic lines of force flows, preventing the external magnetic field from permeating the superconductor and its hollow section.

The present invention uses a tube-shaped superconducting magnetic shield, since the superconducting tube can easily shield even the high-intensity magnetic field having the magnetic lines of force, the direction of which aligns with the center axis direction of the hollow section of the superconducting tube. If a mere tube-shaped high-intensity magnetic substance is used as the magnetic shield, the magnetic lines of force can easily permeate the hollow section of the magnetic substance, the high-intensity magnetic field is maintained and the magnetic working material is not demagnetized at all.

Furthermore, the present invention uses the external magnetic field outside the superconducting tube as a magnetization space and also uses the zero-intensity magnetic field in the hollow section of the tube as a demagnetization space. With this structure, magnetization and demagnetization can be repeated very easily by inserting and extracting the magnetic working material between the opening section and the hollow section of the tube. It is therefore inevitable that the present uses the tube-shaped superconducting magnetic shield.

The tube of the superconducting magnetic shield is made of a Nb-Ti alloy or NbN-TiN based compound when the tube is used below the temperature of liquid helium, or made of a class-2 superconductor, such as a Y-Ba-Cu-O-based or Bi-Sr-Cu-O-based oxidized superconductor when the tube is used below the temperature of liquid nitrogen.

The maximum magnetic shielding amount (the maximum magnetic field intensity of the external magnetic field capable of maintaining the zero-intensity magnetic field in the hollow section) of this kind of tube is greater as the thickness of the tube is larger. In the case of a tube made of a uniform superconducting alloy, the magnetic flux permeated the fringe section of the tube flows quickly into the inside of the tube, causing partial heating. This flow of the magnetic flux generates inside the tube as a chain reaction and the temperature of the superconducting tube rises over its critical temperature. Finally its superconductivity is apt to be lost. This phenomenon is referred to as "flux jump." To solve this problem, a superconducting magnetic shield having the shape of a lamination tube made by alternatively laminating superconductors 31 (thin ring-shaped pieces made of a Nb-Ti alloy, for example) and normal conductors 32 (thin aluminum ring-shaped pieces, for example) as shown in FIG. 3, or a superconducting magnetic shield having the shape of another lamination tube made by alternatively laminating, winding and joining thin band-shaped pieces of superconductors 31 and normal conductors 32 (preferably made of a non-magnetic metal with high heat conductivity) to form the shape of a tube as shown in FIG. 5 is preferably used for the tube-shaped superconducting magnetic shield of the present invention. [The above-mentioned two lamination tubes correspond to U.S. Pat. application Ser. No. 4,942,379, Canada Patent Application No. 2000104-6 and Europe Patent Application No. 83910070.0 (Laid-open Patent Application No. 0365171/A1), and all of these applications have been filed by the applicant of the present application.]

The lamination tube comprising thin ring-shaped pieces is used for the type of the superconducting magnetic shield 3 to be inserted into the hollow section of the superconducting coil 1 shown in FIGS. 1(a) and 1(b) or in FIGS. 2(a) and 2(b). As shown in FIG. 4, this type is suited to prevent the magnetic lines of force 9 being parallel to the axis of the tube from permeating the hollow section 33 of the superconducting magnetic shield 3. Since each ring-shaped superconducting piece is perpendicular to the magnetic lines of force 9, shielding current flows in each ring-shaped piece to cancel the magnetic lines of force 9 and no magnetic field is formed in the hollow section.

As the thin ring-shaped piece is made thinner, the occurrence of flux jump at the thin superconductor layer becomes more difficult. Even if flux jump occurs, it is limited inside the ring-shaped piece. In addition, since the ring-shaped normal conductor piece intervening between the ring-shaped superconductor pieces prevents the magnetic flux from flowing, the chain reaction of flux jump is hard to occur. Moreover, since the ring-shaped normal conductor piece transfers heat outward, the danger of temperature rise over the critical temperature is lessened.

Figure 5A:
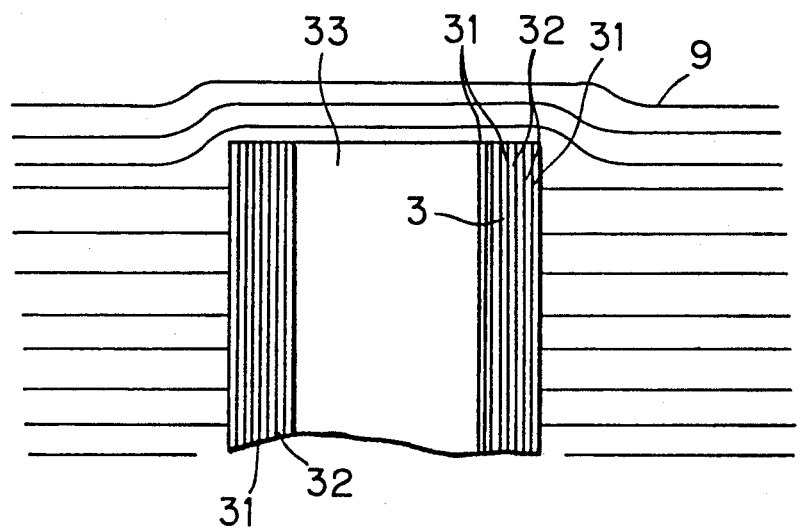
FIGS. 5($a$) and 5($b$) shows the relationship between a tube-shaped superconducting magnetic shield formed by alternately laminating thin band-shaped superconductor layers and thin band-shaped normal conductor layers and the external magnetic field of the magnetic shield common with the first and second inventions.
Figure 5B:
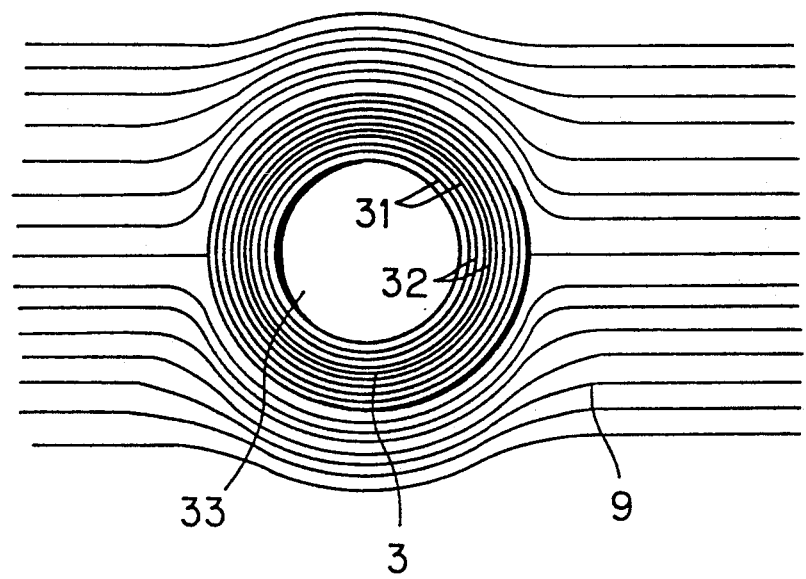

In the case of the lamination tube comprising thin band-shaped pieces, as shown in FIG. 5(a), local shield current flows on the tube's lamination surfaces having elements perpendicular to the magnetic lines of force in the magnetic field existing in the direction perpendicular to the center axis of the tube. As shown in FIG. 5(b), the magnetic lines of force pass around the surface of the tube and no magnetic field generates in the hollow section 33. This type of lamination tube comprising the thin band-shaped pieces is suited for the tube-shaped superconducting magnetic shield 3 disposed between a pair of superconducting coils shown in FIGS. 1(c) and 1(d) or in FIGS. 2(c) and 2(d).

The lamination tube of the superconducting magnetic shield 3 can easily have a magnetic shielding performance of 5T or more when the thickness of the thin layer of a Nb-Ti alloy is 20 $\mu$m or less, the thickness of the thin layer of aluminum is also 20 $\mu$m or less and the total thickness of all lamination layers is about 5 mm. The magnetic shield 3 can therefore easily shield a magnetic field with a high intensity of about 5T existing in the hollow section of the superconducting coil.

For the superconducting magnetic shield 3, a sintered body of preformed superconductor oxide powder can be used, alternatively, a sintered body made by alternately laminating, winding and sintering band-shaped thin superconductor oxide layers and band-shaped thin nonmagnetic metal layers to form the shape of a tube can be used. Such a single sintered tube made by using the superconductor oxide layers has sufficient shielding performance, since the superconductor oxide is insensitive to an unstable phenomenon due to flux jump even when the thickness of the tube is made larger.

Superconductors made by doping halogen elements, alkaline metals or rare earth elements in fullerene comprising spherical clusters with carbon atoms disposed in spherical forms can also be used for the superconducting magnetic shield 3.

For the magnetic working material of the present invention, a substance, which generates a large change in entropy as the magnetic flux density and temperature change, is used at the working temperature of the magnetic working material. At a temperature of 20K. or less, a garnet-type gadolinium or cadmium oxide is used. At a high temperature of 20K. or more, a magnet substance, such as $DyAl_2$ or an aluminum compound of a rare earth metal, such as $RAl_2$ is used.

Moreover, for the magnetic working material of the present invention, a lamination body or a wound body comprising thin magnetic substance films and thin heat conductor films is also used preferably.

The magnetic working material must efficiently transfer generated heat and coldness to the high-temperature heat bath and the low-temperature heat bath respectively. From this point of view, Gd-Ga oxide garnet is ideal since it has high heat conductivity. The heat conductivity of the magnetic working material can be raised further by reducing heat diffusion using the garnet as a monocrystal and by forming a silver film on the external surface of the crystal. However, due to the abrupt change in the magnetic field in the magnetization and demagnetization processes, eddy current flows on the silver film and generates slight Joule heat, thereby reducing the heat efficiency in the demagnetization process. Since the magnetic working material of the first invention is a lamination body or a wound body comprising thin magnetic substance films and thin heat-conductor films, the generation of eddy current can be reduced extremely by nearly aligning the direction parallel to the films with the direction of the magnetic lines of force, even if such silver films are used for the thin heat-conductor films. In this condition, if the direction of the surface of the film is nearly aligned with the direction of the heat switch, heat conduction from the magnetic substance to the heat switch is increased. When this kind of lamination body or wound body is used to make a tube-shaped magnetic working material, it is possible to dispose the magnetic working material so that the center axis direction of the column (parallel to the surface of the thin film) aligns with the direction of the magnetic lines of force and the heat conduction direction. Even when the height of the tube is made relatively larger, the heat conduction is not obstructed.

A method of producing the lamination body comprising preparing a silver film, for example, for the thin good heat-conductor film and a thin silver-garnet film made by vacuum-depositing Gd-Ga oxide on the silver film, for example, for the thin magnetic film, laminating these films in a plurality of layers and hot-pressing the lamination to form a lamination body. Instead, the layer-shaped bands obtained by depositing the above-mentioned garnet on the band-shaped silver films wound, heated and annealed to form the wound body can also be used.

A system wherein a transfer rod fixed to the superconducting magnetic shield or the magnetic working material is directly connected to the reduction gear shaft of a motor via a crank shaft, a cam mechanism or a link mechanism, or a system wherein a drive rod is directly connected to the plunger of a hydraulic cylinder is used as the reciprocating means. Either system needs a mechanism which quickly moves the transfer rod and stops to hold the rod for a constant period in the demagnetizacion and magnetization processes.

The first invention is then detailed below. The magnetic refrigerator of the first invention relates to a static magnetic refrigerator comprising the superconducting coil 1 generating high-intensity magnetic field and the magnetic working material 2 disposed in the hollow section of the superconducting coil 1 as shown in FIGS. 1(a) and 1(b). Referring to these figures, during the reciprocative movement of the superconducting magnetic shield 3 between the hollow section of the superconducting coil 1 and the outside of the opening of the coil, the superconducting magnetic shield 3 undergoes high resiliency when it is moved from a low-intensity magnetic field to a high-intensity magnetic field. The reciprocating means thus requiere very great operation force.

To solve this problem, with the magnetic refrigerator of the first invention, the tube-shaped superconducting magnetic shield 3 is disposed in the hollow section of the superconducting coil 1 so that the shield 3 can reciprocate inside the range between both the opening ends of the hollow section of the superconducting coil 1 and so that the hollow section of the superconducting magnetic shield 3 can accommodate the magnetic working material 2. In the magnetization process, the superconducting magnetic shield 3 is reciprocated inside the range between both the opening ends by the reciprocating means so that the demagnetization process wherein the magnetic working material 2 is accommodated in the hollow section of the superconducting magnetic shield 3 and demagnetized, and the magnetization process wherein the magnetic working material 2 is extracted from the hollow section and demagnetized are repeated.

More specifically, even if the hollow section 33 of the superconducting magnetic shield 3 is moved in the process for accommodating the magnetic working material 2 and in the process for moving away from the magnetic working material 2, the superconducting magnetic shield 3 is disposed within the hollow section of the superconducting coil 1. Therefore, the superconducting magnetic shield 3 does not project or depart outside the opening ends of the hollow section of the superconducting coil 1. Since a nearly uniform magnetic field is formed in the hollow section of the solenoid coil of the superconducting coil 1, even if the magnetic shield, i.e., a superconductor, is moved in parallel to the direction of the magnetic lines of force in the uniform magnetic field, no magnetic force is applied to the superconductor. Therefore, the drive force of the means for reciprocating the magnetic shield in the hollow section of the solenoid coil can be made small.

Example of the First Invention

Figure 6:
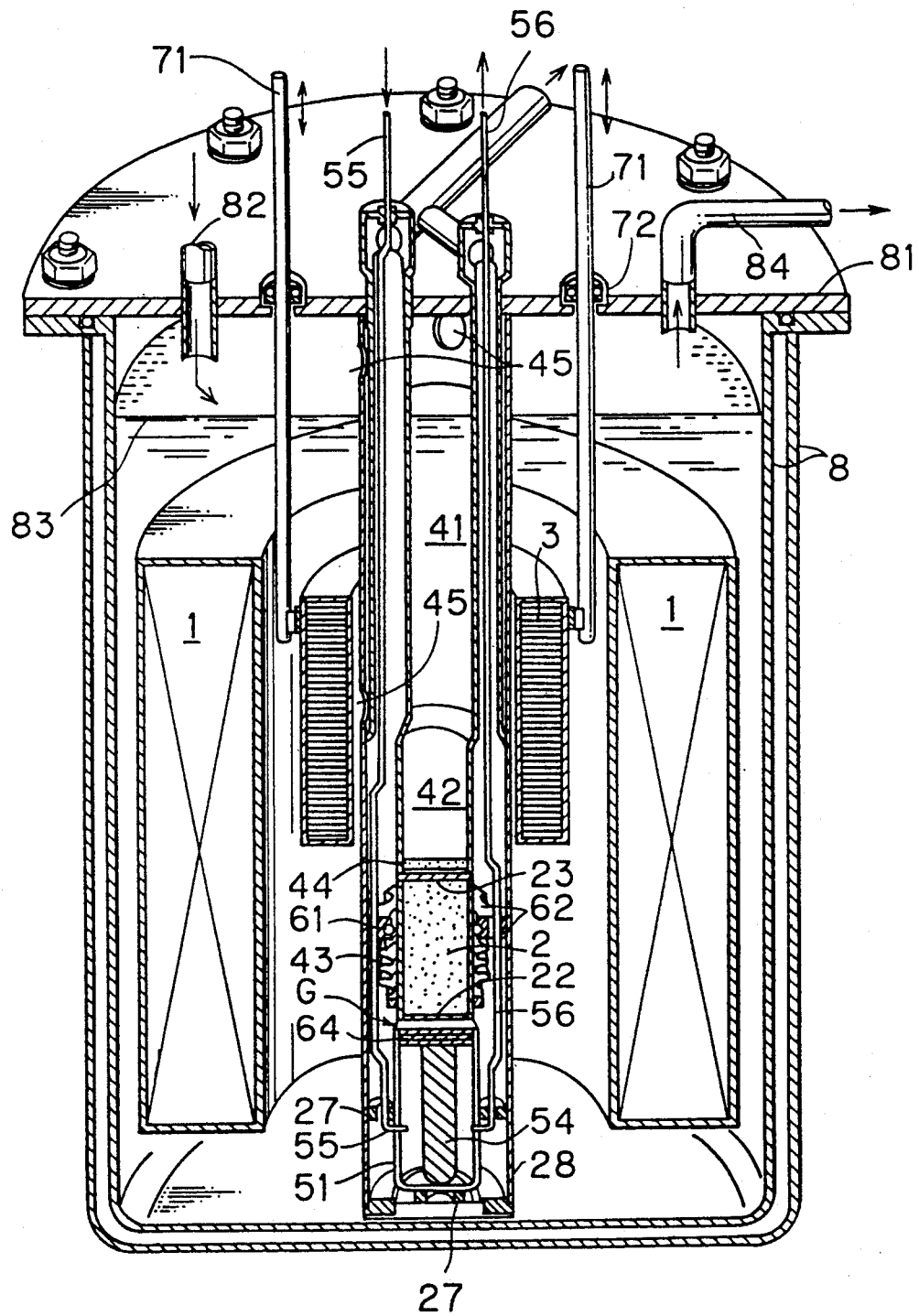
FIG. 6 is a sectional view of an example of the static magnetic refrigerator of the first invention, showing the magnetization condition of the refrigerator.

An example of the first invention is explained below referring to the accompanying drawings. FIG. 6 is a sectional view of the static magnetic refrigerator of the first invention having a refrigerating capacity for generating coldness below the temperature of liquid helium. A superconducting coil 1 is fixed in an adiabatic container 8 which is filled with liquid helium, a tube-shaped superconducting magnetic shield 3 is suspended in the hollow section of the coil 1 by support rods 71 which pass through the upper lid 81 of the container 8, and a lift means (not shown) is connected to the support rods 71 so that the magnetic shield 3 is movable up and down.

On the lower surface of the upper lid 81, a protection tube 28 suspended from the upper lid 81 is fixed so that the protection tube 28 passes through the hollow section of the magnetic shield 3. The inner upper section of the protection tube 28 forms a high-temperature liquid bath which is filled with liquid helium through openings 45 capable of allowing circulation of liquid helium from the adiabatic container 8 by convection. The liquid helium reaches an inner space wherein the seal end section 42 of the high-temperature liquid bath is sealed by a magnetic substance 44.

At the lower section of the protection tube 28, a cylindrical magnetic working material 2 is held movably up and down by an adiabatic ball bearing 61. A bellows 43, one end of which is connected to the base section 62 of the bearing 61, is disposed so that the other end of the bellows 43 is connected to the lower section of the magnetic working material 2 to always apply resilient downward force to the magnetic working material 2. The external surface of the sealing end section of the above-mentioned high-temperature liquid bath is disposed close to and faces the upper surface of the magnetic working material 2 to form a high-temperature heat switch.

At the bottom of the protection tube 28, a low-temperature liquid bath 51 is fixed and a heat conductor 64 is hermetically installed at the upper section of the low-temperature liquid bath 51. The upper surface of the heat conductor 64 is disposed close to and contactably faces the lower surface of the magnetic working material 2 to form a low-temperature heat switch. At the lower surface of the heat conductor 64, a heat transfer column 54 for transferring coldness is projected into the low-temperature liquid bath 51. To the low-temperature liquid bath 51, a narrow pipe 55 for supplying helium gas and a narrow pipe 56 for discharging helium gas are connected.

The inner lower section of the protection tube 28 is maintained at a high vacuum. The high-temperature heat switch means, the magnetic working material 2, the low-temperature heat switch means and the low-temperature liquid bath 51 are in vacuum and adiabatic conditions.

Figure 7:
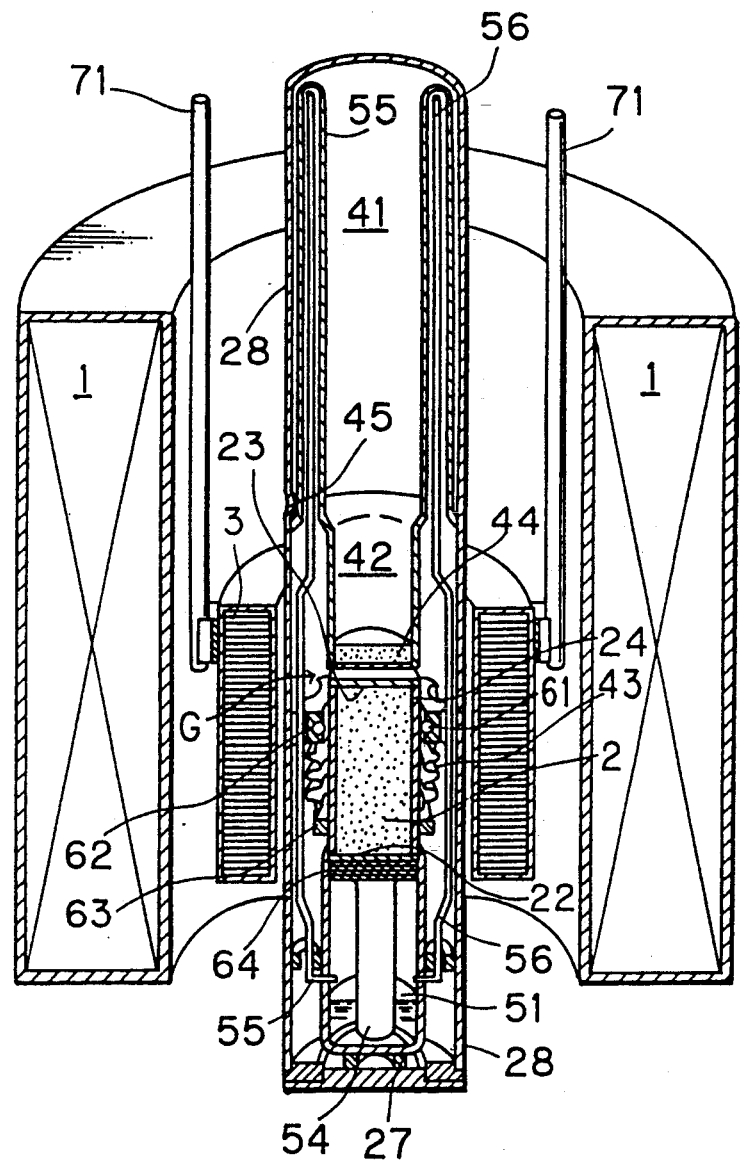
FIG. 7 is a partially sectional view of the demagnetization process of the refrigerator shown in FIG. 6.

At the upper movement limit of the lift means, the lower end of the superconducting magnetic shield 3 is required to be set at a position higher than the magnetic substance 44 of the high-temperature heat switch. At the lower end of the lift means, the hollow section of the superconducting magnetic shield 3 is required to be set at a position where the hollow section can accommodate both the magnetic substance 44 of the high-temperature heat switch and the magnetic working material 2 as shown in FIG. 7. The height and movement stroke of the superconducting magnetic shield 3 can thus be roughly determined on the basis of the addition of the lengths of the magnetic substance 44 and the magnetic working material 2. In addition, the superconducting coil 1 is a solenoid coil formed so that its height (the distance between the opening ends of the hollow section of the coil) is larger than the addition of the height and the moving stroke of the magnetic shield.

With this example, the superconducting coil 1 is made by winding Nb-Ti alloy wires.

The superconducting magnetic shield 3 is a lamination body comprising a plurality of Nb-Ti alloy foil ring-shaped pieces and a plurality of aluminum foil ring-shaped pieces, and it is cooled by liquid helium and in a superconducting condition.

The magnetic working material 2 is a monocrystalline column made of Gd-Ga oxide garnet and its external surface is coated with a silver film 24 to increase its heat conduction. The silver film layer 24 can be omitted to prevent heat generation due to eddy current in the magnetization and demagnetization processes. Furthermore, the upper surface of the magnetic working material 2 is coated with a silver film layer or a thin crystal plate. The magnetic substance 44 of the high-temperature heat switch is also made of Gd-Ga oxide garnet. A crystal is used for the heat conductor 64. Next to the crystal, a silver ring is also suited for the heat conductor 64.

FIG. 6 shows the magnetization process of the magnetic refrigerator of the first invention. In this process, the superconducting magnetic shield 3 is lifted to its upper movement limit by the lift means (not shown) and the magnetic working material 2 is magnetized by the high-intensity magnetic field of the superconducting coil 1 and is generating heat. The magnetic substance 44 of the high-temperature heat switch is also magnetized. Since the magnetic working material 2 is attracted to the lower surface of the magnetic substance 44 against the resilience of the bellows 43 and contacts the lower surface, the heat of the magnetic working material 2 is conducted to the magnetic substance 44 and absorbed by the liquid helium in the sealing end section 42 of the high-temperature liquid bath 41 and the magnetic working material 2 is cooled. On the other hand, since a gap G is formed between the heat-conductor disc 64 of the low-temperature heat switch and the lower surface of the magnetic working material 2, heat generated due to magnetization is not conducted to the low-temperature liquid bath 51.

FIG. 7 shows the demagnetization process wherein the superconducting magnetic shiel 3 is lowered to its lower end by the lift means. In this process, the magnetic working material 2 is in the hollow section of the superconducting magnetic shield 3, is demagnetized and generates coldness. Since the magnetic substance 44 of the high-temperature heat switch is also demagnetized, the attraction force between the magnetic substance 44 and the magnetic working material 2 reduces. As a result, the magnetic working material 2 is pulled back by the resilience of the bellows 43 and the gap G is formed above the upper surface of the magnetic working material 2 and the coldness is not removed by the high-temperature liquid bath 41.

On the other hand, since the heat-conductor disc 64 of the low-temperature heat switch does not act on the magnetic lines of force at all, the disc 64 contacts the lower surface of the magnetic working material 2 by the pushing force of the bellows 43. The coldness of the magnetic working material 2 is conducted to the heat-conductor disc 64 and the heat-transfer column 54 and cools and liquefies the helium gas in the low-temperature liquid bath 51, then the liquid helium accumulates in the liquid bath.

The above-mentioned magnetization and demagnetization processes can be repeated by simply repeating the up-and-down movement of the superconducting magnetic shield 3, and the temperature of the liquid helium in the low-temperature liquid bath 51 can be lowered below the equilibrium temperature of the ultra-flowing helium. The obtained ultra-low temperature can thus be used.

When the refrigerator is installed in an artificial satellite and is used in a weightless condition, the ultra-flowing helium floats as drops in the low-temperature liquid bath 51, thereby being in danger of reducing the heat conduction to the heat transfer column 54. In this case, a porous sintering substance made of copper can be preferably used for the heat-transfer column 54 as a carrier to capture the floating liquid drops in the sintering substance.

Although the magnetic working material 2 of the above-mentioned magnetic refrigerator is moved in the magnetization and demagnetization processes, since its movement distance is only about 1 mm, the magnetic refrigerator can be referred to as a static magnetic refrigerator. Unlike this type, a heat switch means having a structure wherein the magnetic working material 2 is fixed completely is described below.

Figure 8A:
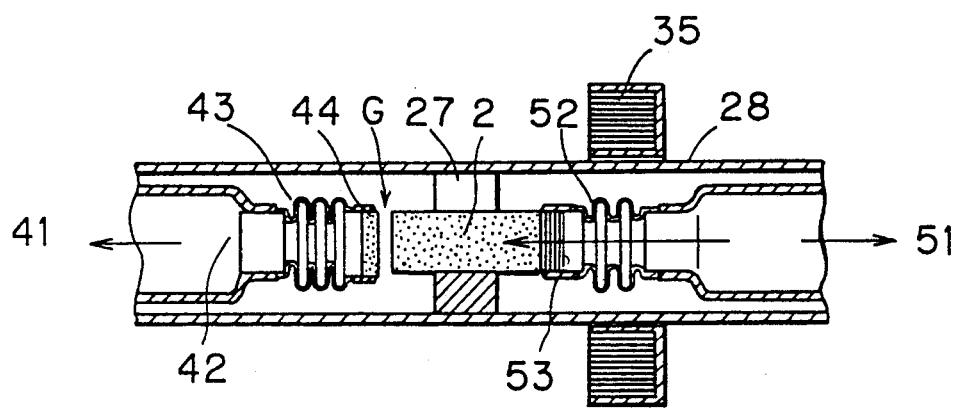
FIG. 8 is a partially sectional view of the magnetic working material and the heat switch mechanism of the first invention.
Figure 8B:
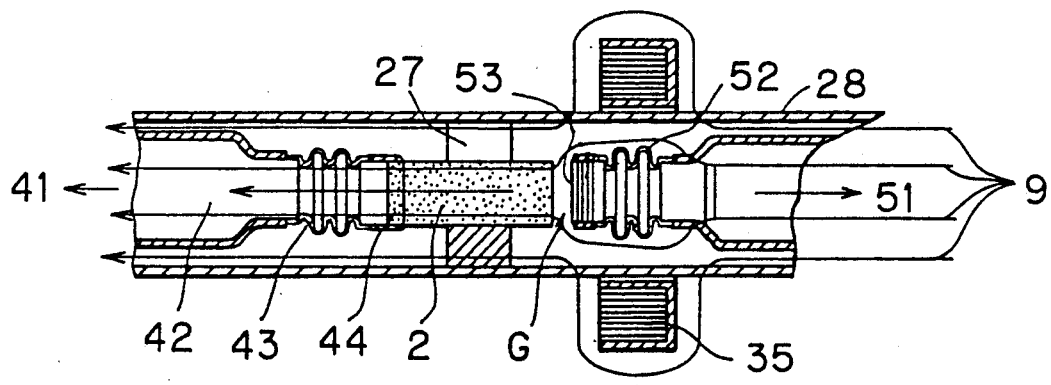

FIGS. 8(a) and 8(b) shown an example of another heat switch means used for a static magnetic refrigerator. In the high-temperature heat switch shown in FIG. 8(a), the magnetic working material 2 is fixed by the adiabatic member 27 in the protection tube 28 and the magnetic substance 44 is connected to the end section of the high-temperature heat bath 41 via the bellows 43 to form a high-temperature sealing end section. The interior of the sealing end section is structured to allow the fluid in the heat bath 41 to flow and the external surface of the magnetic substance 44 located at the leading end of the sealing end section faces one end of the magnetic working material 2 so that the external surface can closely contact the end. When no magnetic field is present, the external surface of the magnetic substant 44 is separated from the end surface of the magnetic working materail 2 by the shrinking force of a bellows 43 and is adjusted to have an appropriate gap G. Since the interior of the protection tube 28 is maintained at a high vacuum and in an adiabatic condition, a gap of about 1 mm is sufficient as the gap G.

On the other hand, in the low-temperature heat switch, superconductor lamination plates 53 are connected to the end section of the low-temperature heat bath 51 via a bellows 52 to form the sealing end section on the low-temperature side. The interior of the sealing end section is filled with gas supplied from the low-temperature heat bath 51. The external surface of the superconductor lamination plates 53 faces the other end of the magnetic working material 2 so that the external surface can closely contact the end. When no magnetic field is present, the external surface of the superconductor lamination plates 53 is adjusted to contact the other end of the magnetic working material 2 by the pushing force of the bellows 52.

Moreover, on the outside of the protection tube 28, a superconductor ring 35 is disposed so that the magnetic field around the superconductor lamination plates 53 of the low-temperature heat switch has a slightly reducing intensity gradient in the direction of the low-temperature heat bath 51.

In the condition shown in FIG. 8(a), the magnetic working material 2 is in the demagnetization process. The coldness generated in this condition passes through the external surfaces of the superconductor lamination plates 53 and cools the fluid in the low-temperature heat bath 51 but the heat conduction of the coldness to the high-temperature heat bath 41 is shut off by the gap G.

In the condition shown in FIG. 8(a), the magnetic working material 2 is in the magnetization process. In this condition, both the magnetic working material 2 and the magnetic substance 44 of the high-temperature heat switch are magnetized by the magnetic lines of force 9. Since the external surface of the magnetic substance 44 closely contacts the magnetic working material 2 by attraction force, the heat generated by magnetization is cooled by the high-temperature heat bath 41. On the other hand, since the superconductor lamination plates 53 of the low-temperature heat switch show diamagnetism, the plates 53 retract in the direction of lowering the magnetic field formed by the above-mentioned superconductor ring 35, i.e., in the direction toward the low-temperature heat bath 51. As a result, a gap G is formed between the superconductor lamination plates 53 and the magnetic working material 2 to shut off the flow of the generated heat to the low-temperature heat bath 51 and the subsequent members.

In the heat switch means described above, the magnetic filed permeating the magnetic substance 44, the magnetic working material 2 and superconductor lamination plates 53 can also be controlled simultaneously by the reciprocating movement of the superconducting magnetic shield 3. No operation section is therefore required. the control is made accurately interlocked with the reciprocating movement of the superconducting magnetic shield 3.

Figure 9:
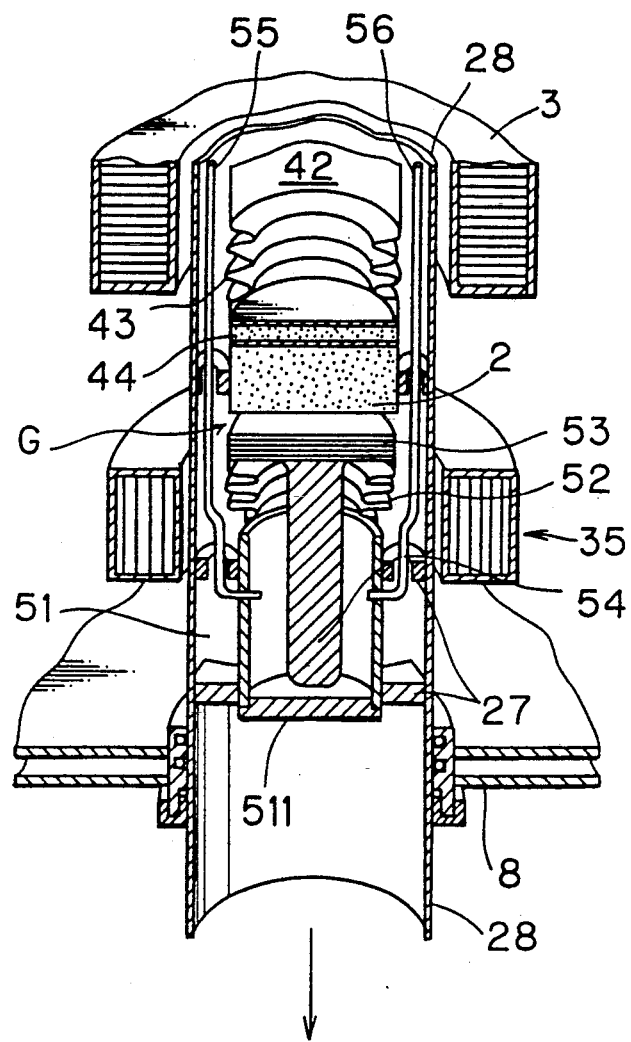
FIG. 9 is a partially sectional view of the low-temperature heat bath of the magnetic refrigerator of the first invention used in the cosmic space.

FIG. 9 is a sectional view of the peripheral section of the low-temperature fluid bath of the magnetic refrigerator of the first invention used in the cosmic space. The protection tube 28 passes through the bottom wall of the vacuum adiabatic container 8 and opens to the cosmic space. The bottom section of the fluid bath 51 is made of copper or silver which has high heat conductivity. The external surface 511 of the fluid bath 51 is flat and an infrared image pickup solid-state device is attached to the flat surface. Since the temperature of the image pickup device is maintained at 1K or less by using helium as fluid, extremely superior infrared images with low heat noise can be obtained.

Figure 10:
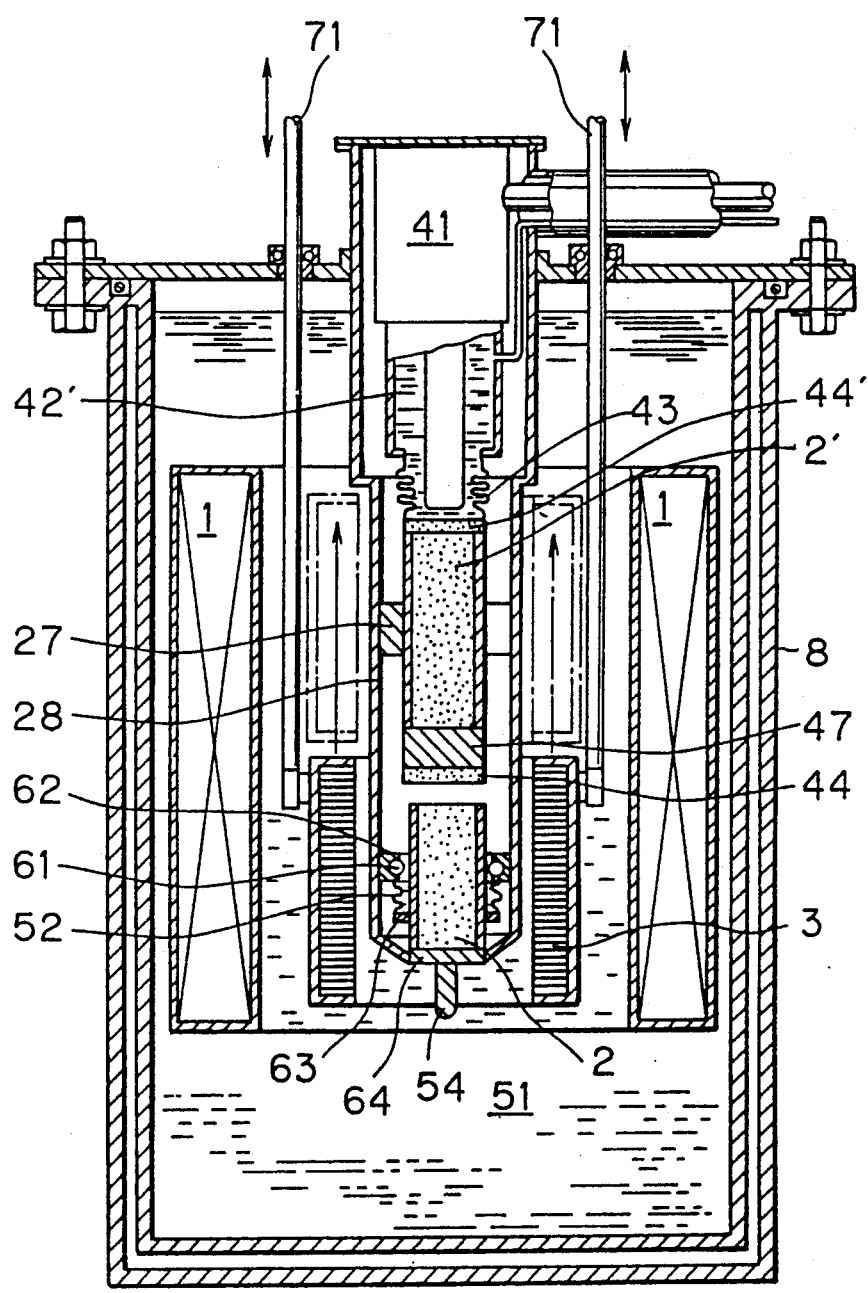
FIG. 10 is a sectional view of the tandem magnetic refrigerator of the first invention.

FIG. 10 is a sectional view of the tandem magnetic refrigerator of the first invention, wherein the magnetic working materials 2, 2' alternately undergo repeated magnetization and demagnetization processes by using the magnetic working materials.2, 2' in two stages and by controlling the high-intensity magnetic field of the superconducting coil 1 via the up-and-down movement of a single unit of the superconducting magnetic shield 3. This example has been designed to produce and cool liquid helium.

In FIG. 10, a compact gas cooler is used in the high-temperature heat bath 41. The interior 42' of the sealing end section located at the lower section of the bath 41 is filled with liquid hydrogen at a temperature of 20K during operation. A disc 44' made of magnetic substance $DyAl_2$ is connected to the leading end of the interior 42' of the sealing end section via a bellows 43'. The upper-satge magnetic working material 2' made of $DyAl_2$ is fixed to the protection tube 28 and the upper surface of the magnetic working material 2' faces the above-mentioned magnetic substance disc 44' to form a high-temperature heat switch for the upper-stage magnetic working material 2'. The low-temperature heat switch for the upper-stage magnetic working material 2' is formed by the disc 44 made of a magnetic substance, Gd-Ga garnet. The disc 44 faces the upper surface of the lower-stage magnetic working material 2 so that the disc 44 can closely contact the upper surface.

The lower-stage magnetic working material 2 is made of a monocrystal of Gd-Ga garnet and is held movably up and down in the protection tube 28 via an adiabatic ball bearing 61 made of polyethylene. The upper surface of the magnetic working material 2 faces the lower surface of the above-mentioned magnetic substance disc 44 so that the upper surface can closely contact the lower surface. In addition, the lower surface of the magnetic working material 2 faces the heat conductor 64 which seals the end section of the protection tube 28 so that the lower surface can closely contact the heat conductor 64. The heat conductor 64 is immersed in the above-mentioned liquid helium to cool the liquid helium bath 51.

In the condition shown in FIG. 10, the superconducting magnetic shield 3 accommodates only the lower-stage magnetic working material 2 and the upper-stage magnetic working material 2' is in the magnetization process. The upper-stage magnetic working material 2' closely contacts the magnetic substance disc 44' and the generated heat is transferred to the gas refrigerator 41. On the other hand, the lower-stage magnetic working material 2 is in the demagnetization process and the generated coldness cools the helium bath 51.

When the superconducting magnetic shield 3 is raised, the upper-stage magnetic working material 2' is demagnetized and coolness is generated. The heat generated by the lower-stage magnetic working material 2 being in the magnetization process is absorbed for cooling.

In this example, since the magnetic shield 3 is accommodated completely in the hollow section of the superconducting coil 1 when the magnetic shield 3 is at its upper movement limit position and when it is at its lower movement limit position, the magnetic shield 3 can be moved up and down very easily.

The second invention is then described below. In the magnetic refrigerator of the second invention, a magnetic working material reciprocates between the high-intensity magnetic field range of a fixed magnet and the zero-intensity magnetic field range of the hollow section of a fixed tube-shaped superconducting magnetic shield. Since no special force is applied to the magnetic working material even when the magnetic working material moves in the range wherein the intensity of the magnetic field changes, the reciprocating means requires no special drive power. In addition, since the tube-shaped superconducting magnetic shield has high magnetic shield performance as described above, the hollow section of the magnetic shield can maintain zero-intensity magnetic field even when the superconducting magnetic shield is disposed and fixed at a part of the hollow section, in the case of using the extremely high-intensity magnetic field of the hollow section of the superconducting coil. Accordingly, the movement stroke of the magnetic working material between the high-intensity magnetic field and the zero-intensity magnetic field can be made shorter than the stroke of the structure without such a magnetic shield.

Example of the Second Invention

Figure 11A:
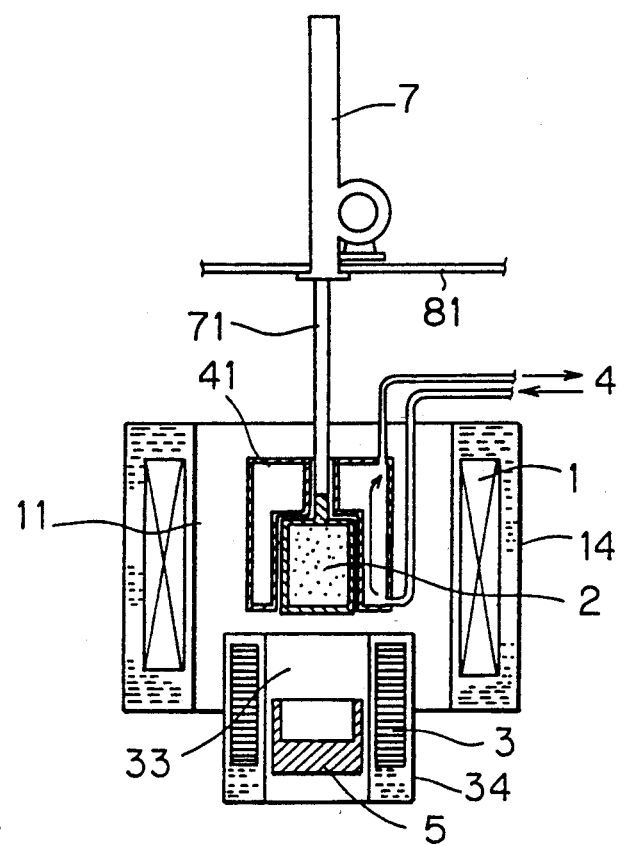
FIGS. 11(a) and 11(b) are sectional views of another example of the unstatic magnetic refrigerator of the second invention.
Figure 11B:
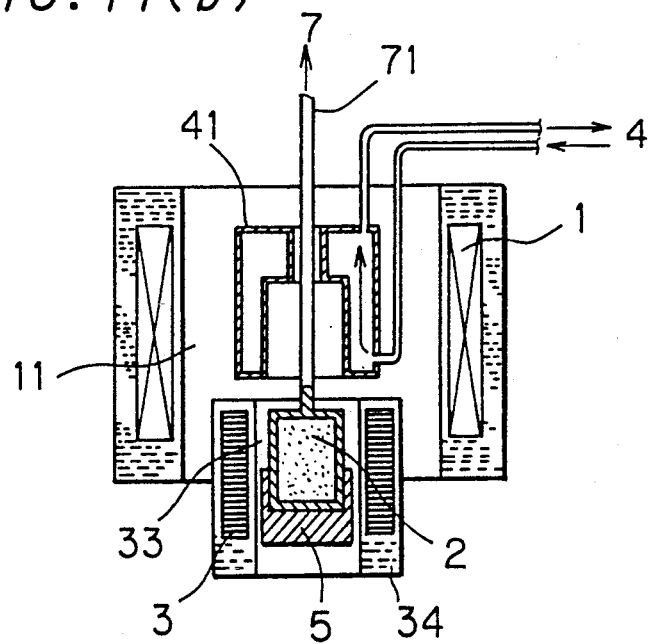

FIGS. 11(b) are the sectional views of the example of the second invention. As shown in FIGS. 11(a) and 11(b), a part of the tube-shaped superconducting magnetic shield 3 comprising a superconducting lamination body is inserted in the lower portion of the hollow section of the superconducting coil 1 and the superconducting magnetic shield 3 is fixed coaxially to the coil 1. The magnetic working material 2 installed at the leading end of the support rod 71 of the lift means 7 is disposed movably so that the magnetic working material 2 can rise to the upper movement limit located in the hollow section of the coil 1 and above the upper opening section of the superconducting magnetic shield 3 and can lower to the lower movement limit position located in the hollow section 33 of the superconducting magnetic shield 3.

The superconducting coil 1 is made by winding Nb-Ti alloy wires and the entire coil 1 is immersed in liquid helium. The hollow section of the superconducting coil 1 generates a permanent high-intensity magnetic field due to permanent current.

The superconducting magnetic shield 3 is made in the form of a tube by using a plurality of Nb-Ti alloy foil lamination layers of and a plurality of aluminum foil lamination layers and is immersed in liquid helium and fixed together with a frame (not shown) which is used to fix the lamination body.

The magnetic working material 2 is a monocrystalline column made of gadolinium-gallium oxide garnet. The exterior of the magnetic working material 2 is coated with a silver film and the leading end of the above-mentioned support rod 71 is fixed to the upper surface of the magnetic working material 2.

The high-temperature heat bath 41 is disposed above the superconducting magnetic shield 3 in the hollow section of the superconducting coil 1. In the hollow section 33 of the superconducting magnetic shield 3, a solid cold bath 5 which functions as the target low-temperature heat bath to be cooled is disposed. The high-temperature heat bath 41 is a container made of a non-magnetic aluminum plate. At its lower section, the bath 41 has a concave section which can accommodate the magnetic working material 2. Gas or liquid helium circulates as a refrigerant between the container and a compact cooler (not shown). The low-temperature solid cold bath 5 is made of sapphire with superior heat conductivity in ultra-low temperature . The refrigerator itself is accommodated in a vacuum adiabatic container (not shown) and isolated thermally. At the upper movement limit of the magnetic working material 2, the upper surface of the magnetic working material 2 contacts the inner surface of the high-temperature heat bath 41 and is cooled. At the lower movement limit of the magnetic working material 2, the magnetic working material 2 is inserted into the hollow section of the superconducting magnetic shield 3 and at the same time the lower surface of the magnetic working material 2 contacts the solid cold bath 5.

When the magnetic working material 2 rises to its upper movement limit and is held as shown in FIG. 11(a), the magnetic working material 2 is magnetized and generates heat. The heat is cooled t to a constant temperature when the magnetic working material 2 contacts the high-temperature heat bath 41. The magnetic working material 2 is then lowered quickly by the lift means 7 as shown in FIG. 11(b) and accommodated and held in the hollow section 33 of the superconducting magnetic shield 3 located at the lower movement limit of the magnetic working material 2. At this position, the magnetic working material 2 is demagnetized and generates coldness. This coldness cools the solid cold bath 5 (low-temperature heat bath). When the magnetic working material 2 is raised again, goes out of the hollow section 33 of the superconducting magnetic shield 3 and is exposed to the high-intensity magnetic field, the magnetic working material 2 generates heat and is cooled by the high-temperature heat bath 41. The solid cold bath 5 (low-temperature heat bath) is always cooled by this reciprocating movement of the magnetic working material driven by the lift means and the temperature of the bath 5 lowers.

With this example of the magnetic refrigerator, a completely-zero-intensity magnetic field can be formed easily at the high-intensity magnetic field position very close to the superconducting coil 1. Accordingly, the reciprocating movement distance of the magnetic working material 2 can be shortened and the magnetization and demagnetization processes can be made close to ideal magnetic refrigerating processes.

With this example, the temperature of the solid cold bath 5 can be set to an ultra-low temperature of about 1K. or less by circulating liquid helium at a temperature of about 4K. through the high-temperature heat bath 41. If an infrared image sensor is installed on the surface of the solid cold bath 5, this example can be used for an infrared image detection unit with low noise.

Figure 12:
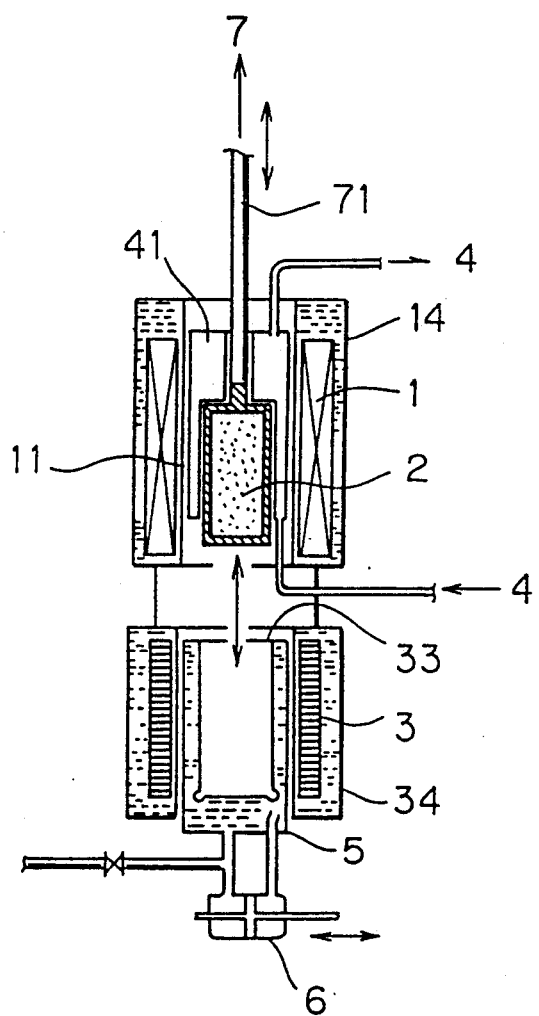
FIG. 12 is a sectional view of an example of the unstatic magnetic refrigerator of the second invention.

FIG. 12 is a sectional view of an example of the magnetic refrigerator of the second invention, wherein the superconducting magnetic shield 3 having an inner diameter similar to that of the superconducting coil 1 is coaxially disposed outside the opening section of the superconducting coil 1. Since the superconducting magnetic shield 3 is not inserted into the hollow section of the superconducting coil 1, the inner diameter of the superconducting coil 1 can be decreased. This type is advantageous since the intensity of the magnetic field can be increased and the almost all ranges of the high-intensity magnetic field at the hollow section of the superconducting coil 1 can be used for magnetization of the magnetic working material 2.

With this example, a helium gas bath 5 is disposed in the hollow section 33 of the superconducting magnetic shield 3 as the low-temperature heat bath 5 to be cooled. The surface of the helium gas bath 5 which contacts the magnetic working material 2 is made flexible to enhance heat transfer. Furthermore, a pump 6 for circulating helium gas is provided to make the temperature inside the bath uniform. Liquid helium gas is produced by cooling the helium gas bath 5.

We claim:

1. A magnetic refrigerator comprising a magnet generating a high-intensity magnetic field, a tube-shaped superconducting magnetic shield, a magnetic working material and a reciprocating means for reciprocatively moving the superconducting magnetic shield or the magnetic working material, whereby a magnetization process wherein said magnetic working material is magnetized in the high-intensity magnetic field and a demagnetization process wherein said magnetic working material is demagnetized by being accommodated in the hollow section of said magnetic shield are repeated by said reciprocating means so that said magnetic working material generates coldness.

2. A static magnetic refrigerator comprising a magnet generating a high-intensity magnetic field, a magnetic working material fixed in the high-intensity magnetic field, a tube-shaped superconducting magnetic shield having a hollow section capable of accommodating the magnetic working material and a reciprocating means for reciprocatively moving the superconducting magnetic shield, whereby a magnetization process wherein the magnetic working material is magnetized in the high-intensity magnetic field by being extracted from the hollow section of said superconducting magnetic shield and a demagnetization process wherein said magnetic working material is demagnetized in the almost-zero-intensity magnetic field in the hollow section of said superconducting magnetic shield by being accommodated in the hollow section of said shield are repeated by said reciprocating means so that said magnetic working material generates coldness.

3. A static magnetic refrigerator comprising a superconducting coil for generating a high-intensity magnetic field and a magnetic working material disposed in the hollow section of the superconducting coil, wherein a tube-shaped superconducting magnetic shield is disposed in the hollow section of said superconducting coil so that said shield can reciprocate inside the range between both the opening ends of the hollow section of said superconducting coil and so that the hollow section of said superconducting magnetic shield can accommodate said magnetic working material, whereby a demagnetization process wherein said magnetic working material is demagnetized by being accommodated in the hollow section of said superconducting magnetic shield and a magnetization process wherein said magnetic working material is magnetized be being extracted from the hollow section are repeated by reciprocating said superconducting magnetic shield using a reciprocating means.

4. A magnetic refrigerator according to claim 3, wherein one end surface of said magnetic working material is connected to a high-temperature heat bath via a high-temperature heat switch means to allow heat transfer to said high-temperature heat bath and the other end surface of said magnetic working material is connected to a low-temperature heat bath via a low-temperature heat switch means to allow heat transfer to said low-temperature heat bath.

5. A static magnetic refrigerator according to claim 4, wherein said high-temperature heat switch means is arranged such that said high-temperature heat bath is formed by a fluid bath, one end of a bellows with resilience is connected to said fluid bath, the other end of said bellows is hermetically sealed by a magnetic substance to form a sealing end section, and the sealing end section is disposed close to said magnetic working material so that the external surface of the sealing end section faces and can closely contact the surface of said magnetic working material.

6. A static magnetic refrigerator according to claim 4, wherein said low-temperature heat switch means is adapted such that said low-temperature heat bath is formed by a fluid bath, one end of a bellows with resilience is connected to said fluid bath, the other end of said bellows is hermetically sealed by a superconductor to form a sealing end section, and the sealing end section is disposed close to said magnetic working material so that the external surface of the sealing end section faces and can closely contact the surface of said magnetic working material.

7. A static magnetic refrigerator according to claim 4, wherein said high-temperature heat switch means is adapted such that said high-temperature heat bath is formed by a fluid bath, said high-temperature fluid bath is sealed by a magnetic substance to form a high-temperature sealing end section, and the high-temperature sealing end section is disposed close to said magnetic working material so that the external surface of the high-temperature sealing end section faces and can closely contact the surface of said magnetic working material, and said low-temperature heat switch means is arranged such that said low-temperature heat bath is formed by a fluid bath, said low-temperature fluid bath is sealed by a nonmagnetic substance to form a low-temperature sealing end section, and the low-temperature sealing end section is disposed close to said magnetic working material so that the external surface of the low-temperature sealing end section faces and can closely contact the other surface of said magnetic working material, and such that said magnetic working material is disposed and movable reciprocatively via an adiabatic bearing fixed to a fixing member, is connected to an adiabatic elastic member, one of which is fixed to said fixing member or the fixing side base section of said bearing, and elastically energized by said elastic member in the demagnetization process so that said magnetic working material closely contacts the external surface of the low-temperature sealing end section.

8. A static magnetic refrigerator according to claim 3 or 4, wherein said magnetic working material is a lamination body or a wound body comprising thin magnetic substance layers and thin heat conductor layers.

9. A static magnetic refrigerator according to claim 2, 3 or 4, wherein said tube-shaped superconducting magnetic shield is a lamination body comprising thin superconductor ring-shaped pieces and thin nonmagnetic metal ring-shaped pieces.

10. A static magnetic refrigerator according to claim 2, 3 or 4, wherein said tube-shaped superconducting magnetic shield is a lamination body made by winding band-shaped thin superconductor layer pieces and band-shaped thin nonmagnetic metal layer pieces into the form of a tube.

11. A static magnetic refrigerator according to claim 2, 3 or 4, wherein said tube-shaped superconducting magnetic shield is a powder-forming sintered body made of an oxidized superconductor or a sintered body made by winding band-shaped thin oxidized superconductor layer pieces and band-shaped thin nonmagnetic metal layer pieces into the form of a tube.

12. An unstatic magnetic refrigerator comprising a magnet generating a high-intensity magnetic field, a tube-shaped superconducting magnetic shield having a hollow section fixed close to the magnet, a magnetic working material movable to be accommodated into the hollow section and a reciprocating means for reciprocatively moving the magnetic working material, said magnetic refrigerator is adapted such that a magnetization process wherein the magnetic working material is magnetized in the high-intensity magnetic field by being extracted from the hollow section of said superconducting magnetic shield and a demagnetization process wherein said magnetic working material is demagnetized in the almost-zero-intensity magnetic field in the hollow section of said superconducting magnetic shield by being accommodated in the hollow section of said magnetic shield are repeated by said reciprocating means so that said magnetic working material generates coldness.

13. An unstatic magnetic refrigerator according to claim 12, wherein said magnetic refrigerator comprises a high-temperature heat bath having a surface capable of contacting at least one surface of said magnetic working material magnetized in the high-intensity magnetic field and a low-temperature heat bath having a surface capable of contacting the other surface of said magnetic working material demagnetized in the hollow section of said superconducting magnetic shield.

14. An unstatic magnetic refrigerator according to claim 12 or 13, wherein said magnetic working material is a lamination body or a wound body comprising thin magnetic substance layers and thin heat conductor layers.

15. An unstatic magnetic refrigerator according to claim 12 or 13, wherein said tube-shaped superconducting magnetic shield is a lamination body comprising thin superconductor ring-shaped pieces and thin normally conducting metal ring-shaped pieces.

16. An unstatic magnetic refrigerator according to claim 12 or 13, wherein said tube-shaped superconducting magnetic shield is a lamination body made by winding band-shaped thin superconductor layer pieces and band-shaped thin nonmagnetic metal layer pieces into the form of a tube.

17. An unstatic magnetic refrigerator according to claim 12 or 13, wherein said tube-shaped superconducting magnetic shield is a powder-forming sintered body made of an oxidized superconductor or a sintered body made by winding band-shaped thin oxidized superconductor layer pieces and band-shaped thin nonmagnetic metal layer pieces into the form of a tube.

* * * * *